United States Patent [19]

Ogawa

[11] Patent Number: 4,758,794
[45] Date of Patent: Jul. 19, 1988

[54] SOUND INTERMEDIATE FREQUENCY DISCRIMINATOR

[75] Inventor: Masumi Ogawa, Kanagawa, Japan

[73] Assignee: Sony Corporation, Tokyo, Japan

[21] Appl. No.: 66,226

[22] Filed: Jun. 25, 1987

[30] Foreign Application Priority Data

Jul. 2, 1986 [JP] Japan .................................. 61-155629

[51] Int. Cl.$^4$ ................................................ H03D 3/00
[52] U.S. Cl. ...................................... 329/140; 329/124; 329/142; 455/187; 455/191
[58] Field of Search ................ 329/110, 120, 124, 125, 329/137, 138, 140, 141, 142, 143; 455/170, 173, 178, 179, 182, 184, 187, 188, 191, 192, 214, 337

[56] References Cited

U.S. PATENT DOCUMENTS 4,608,539 8/1986 Lawton ........................... 329/137 X Primary Examiner—Eugene R. LaRoche
Assistant Examiner—David Mis
Attorney, Agent, or Firm—Alvin Sinderbrand

[57] ABSTRACT

A discriminator for a plurality of sound intermediate frequencies which are different from each other includes a plurality of selectively operable resonance circuits each of which is formed of a winding of a respective fixed inductance value and a capacitor of a fixed capacitance value, and any deviation of the tuned frequency of a selected resonance circuit is corrected by a variable reactance element which is common to all of the resonance circuits, to thereby remove the necessity of individual adjustments, simplify the circuit configuration, and decrease the cost thereof.

8 Claims, 5 Drawing Sheets

SOUND INTERMEDIATE FREQUENCY DISCRIMINATOR

BACKGROUND OF THE INVENTION

This invention relates generally to a sound intermediate frequency descriminator suitable for use in a multi-system television receiver.

DESCRIPTION OF THE PRIOR ART

The television systems in the several countries do not have a unified standard so that the numbers of scanning lines in each field, the numbers of fields per second and so on are different from one country to another. The various color television systems that are in use are referred to as the NTSC system, the PAL system and the SECAM system. Further, television systems in the VHF and UHF bands are characterized as A,M,N,C,B,G,H,I,D,K,K1,L,and E systems according to the differences between the respective video intermediate frequencies, sound intermediate frequencies and the like. Thus, for example, the sound intermediate frequency (SIF) of the above mentioned M system employing the NTSC standard is 4.5 MHz, the SIF for the B and G systems employing the PAL and SECAM standards is 5.5 MHz, the SIF for the I system according to the PAL standard is 6.0 MHz, and the SIF for the D and K systems employing the SECAM standard is 6.5 MHz.

It has been proposed to provide a so-called multi-system television receiver, that is, a single receiver that may be selectively adapted to receive television signals according to a number of the different systems. More specifically, a multi-system television receiver has been proposed in which a sound intermediate frequency signal discriminator is selectively adapted to detect four different sound intermediate frequencies associated with respective ones of the above-mentioned systems, for example, the M system, the B and G systems, the I system and the D and K systems. In such sound intermediate frequency discriminator according to the prior art, a sound intermediate frequency or SIF signal is supplied to an FM detecting circuit. The FM detecting circuit includes resonance circuits which are tuned to the sound intermediate frequencies of the several systems to be received, for example, 4.5 MHz for the M system, 5.5 MHz for the B and G systems, 6.0 MHz for the I system, and 6.5 MHz for the D and K systems. The resonance circuits tuned to different sound intermediate frequencies, respectively, each have a respective capacitor and inductor connected in parallel, and at least one of which is variable for fine-tuning the resonance circuit to the desired sound intermediate frequency. Switching transistors are connected with the respective resonance circuits and selectively respond to a suitable switching signal for making operable the resonance circuit substantially tuned to the sound intermediate frequency corresponding to the system of the television signal being received.

The above described mutli-system television receiver according to the prior art is disadvantageous in that the resonance circuits of the sound intermediate frequency discriminator are made up of numerous component parts which have to be accurately adjusted in view of variations among such parts when being manufactured and assembled and drift due to temperature variations.

In another multi-system television receiver according to the prior art, the sound intermediate frequency discriminator employs ceramic filters so as to avoid the necessity of adjusting the frequency of the resonance circuits. However, such ceramic filters are expensive so that the costs of the sound intermediate frequency discriminator is undesirably increased.

OBJECTS AND SUMMARY OF THE INVENTION

Accordingly, it is an object of this invention to provide a sound intermediate frequency discriminator for a multi-system television receiver which avoids the above-mentioned disadvantages of the prior art.

More specifically, it is an object of the present invention to provide a sound intermediate frequency discriminator which does not require adjustment, has a simple circuit configuration and can be manufactured at low cost.

According to an aspect of the invention, a sound intermediate frequency discriminator comprises: frequency detecting means including a plurality of resonance means each formed of a winding having a respective fixed inductance value and a capacitor for detecting a plurality of respective sound intermediate frequencies which are different from each other; a plurality of switching means selectively operable for selecting one of the plurality of resonance means and thereby adapting the frequency detecting means for detection of the respective sound intermediate frequency; a variable reactance element connected in common with the plurality of resonance means and being controllable for correcting any deviation of a tuned frequency of the selected one of the resonance means from the respective sound intermediate frequency; and direct current feedback loop means for feeding an average output voltage from the frequency detecting means to the variable reactance element for controlling the latter.

The above, and other objects, features and advantages of the invention will be apparent in the following detailed description of preferred embodiments of the invention when read in conjunction with the accompanying drawings in which corresponding parts and components are identified by the same reference numerals in the several views of the drawings.

DESCRIPTION OF THE PREFERRED EMBODIMENTS

Figure 1:
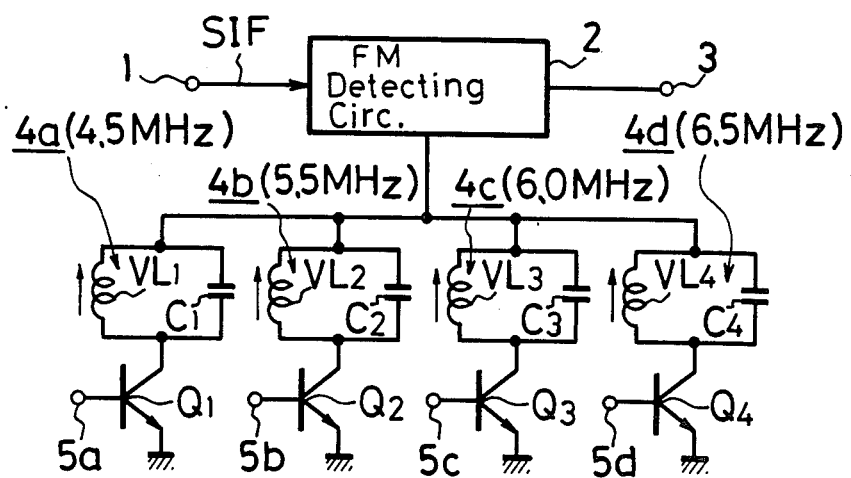
FIG. 1 is a circuit diagram illustrating a sound intermediate frequency signal discriminator according to the prior art.

In order that the problems overcome by the present invention may be fully understood, a sound intermediate frequency discriminator according to the prior art will be initially described in detail with reference to FIG. 1. In such discriminator, a sound intermediate frequency or SIF signal is supplied through an input terminal 1 to an FM detecting circuit 2. Such FM detecting circuit 2 comprises resonance circuits 4a, 4b, 4c and 4d which are, for example, are respectively tuned to the sound intermediate frequencies of the M system, the B and G systems, the I system and D and K systems, that is, to 4.5 MHz, 5.5 MHz, 6.0 MHz and 6.5 MHz, respectively. Although FIG. 1 illustrates the resonance circuits 4a, 4b, 4c and 4d and respective switching transistors $Q_1$, $Q_2$, $Q_3$, and $Q_4$ outside the block which represents FM detecting circuit 2 for the sake of clarity, it will be understood that the resonance circuits and respective switching transistors are, in fact, parts of the FM detecting circuit.

The resonance circuits 4a, 4b, 4c and 4d to be tuned to different sound intermediate frequencies, respectively, are comprised of capacitors $C_1$, $C_2$, $C_3$ and $C_4$, respectively, and inductors or windings $VL_1$, $VL_2$, $VL_3$ and $VL_4$, respectively, each connected in parallel with the respective capacitor. One or the other, or perhaps both of the capacitor and inductor in each of the resonance circuits 4a, 4b, 4c and 4d is variable to permit adjustment of the respective resonance circuit to the required sound intermediate frequency. The parallel-connected resonance circuits 4a, 4b, 4c, and 4d are connected in common with each other at one end for connection to other components of FM detecting circuit 2, and the other ends of the resonance circuits 4a, 4b, 4c and 4d are connected to collectors of the switching transistors $Q_1$, $Q_2$, $Q_3$ and $Q_4$ which have their respective emitters connected to ground. Terminals 5a, 5b, 5c and 5d are connected to the bases of switching transistors $Q_1$, $Q_2$, $Q_3$ and $Q_4$, respectively, for the selective application of a switching signal thereto by which one of the switching transistors is turned on for rendering operative the respective resonance circuit 4a, 4b, 4c or 4d and thereby adapting the discriminator for detecting the sound intermediate frequency signal associated with the above-mentioned M system, the B or G system, the I system, or the D or K system, respectively. Finally, a discriminated sound signal is delivered from FM detecting circuit 2 to an output terminal 3.

It will be appreciated that, in the discriminator according to the prior art as illustrated on FIG. 1, the capacitance value of the capacitor, and/or the inductance value of the winding in each of the resonance circuits 4a, 4b, 4c and 4d has to be accurately adjusted for precise tuning to the sound intermediate frequency signal associated with the corresponding television system. Such precise adjustment is obviously troublesome and time consuming. Further, the variable capacitors, and/or variable windings required for the several resonance circuits 4a, 4b, 4c and 4d obviously result in a relatively large number of parts so that the production costs of the discriminator are relatively high.

Figure 2:
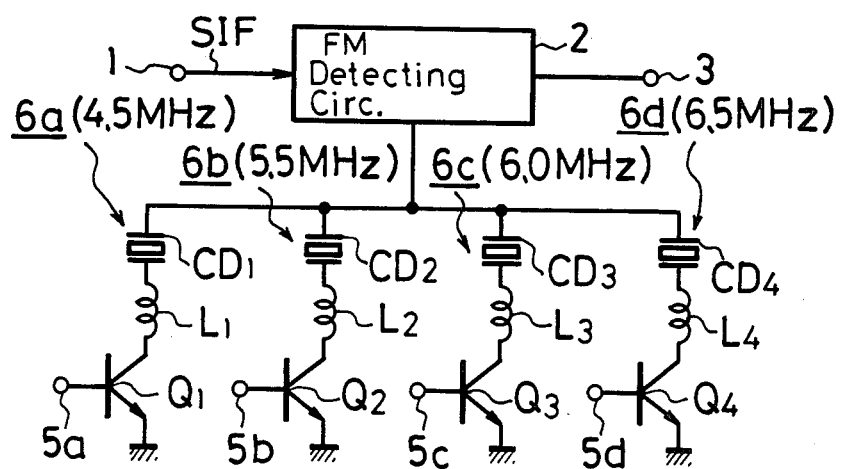
FIG. 2 is a circuit diagram illustrating another sound intermediate frequency signal discriminator according to the prior art.

Referring now to FIG. 2, it will be seen that, in another sound intermediate frequency discriminator according to the prior art, an attempt has been made to avoid the disadvantageous need for precise adjustments of the resonance circuits 4a, 4b, 4c and 4d by replacing the same with resonance circuits 6a, 6b, 6c and 6d, respectively. As shown on FIG. 2, the resonance circuits 6a, 6b, 6c and 6d comprise serial circuits of ceramic filters $CD_1$, $CD_2$, $CD_3$ and $CD_4$ and windings $L_1$, $L_2$, $L_3$ and $L_4$ respectively. The ceramic filters $CD_1$, $CD_2$, $CD_3$ and $CD_4$ respectively correspond to the sound intermediate frequencies of the M system, the B and G systems, the I system, and the D and K systems. Although the discriminator according to the prior art as shown on the FIG. 2 does not need adjustment of the resonance circuits, the ceramic filters $CD_1$, $CD_2$, $CD_3$ and $CD_4$ are expensive so that the cost of the discriminator is undesirably increased.

A sound intermediate frequency (SIF discriminator according to an embodiment of the present invention will now be described with reference to FIG. 3.

Figure 3:
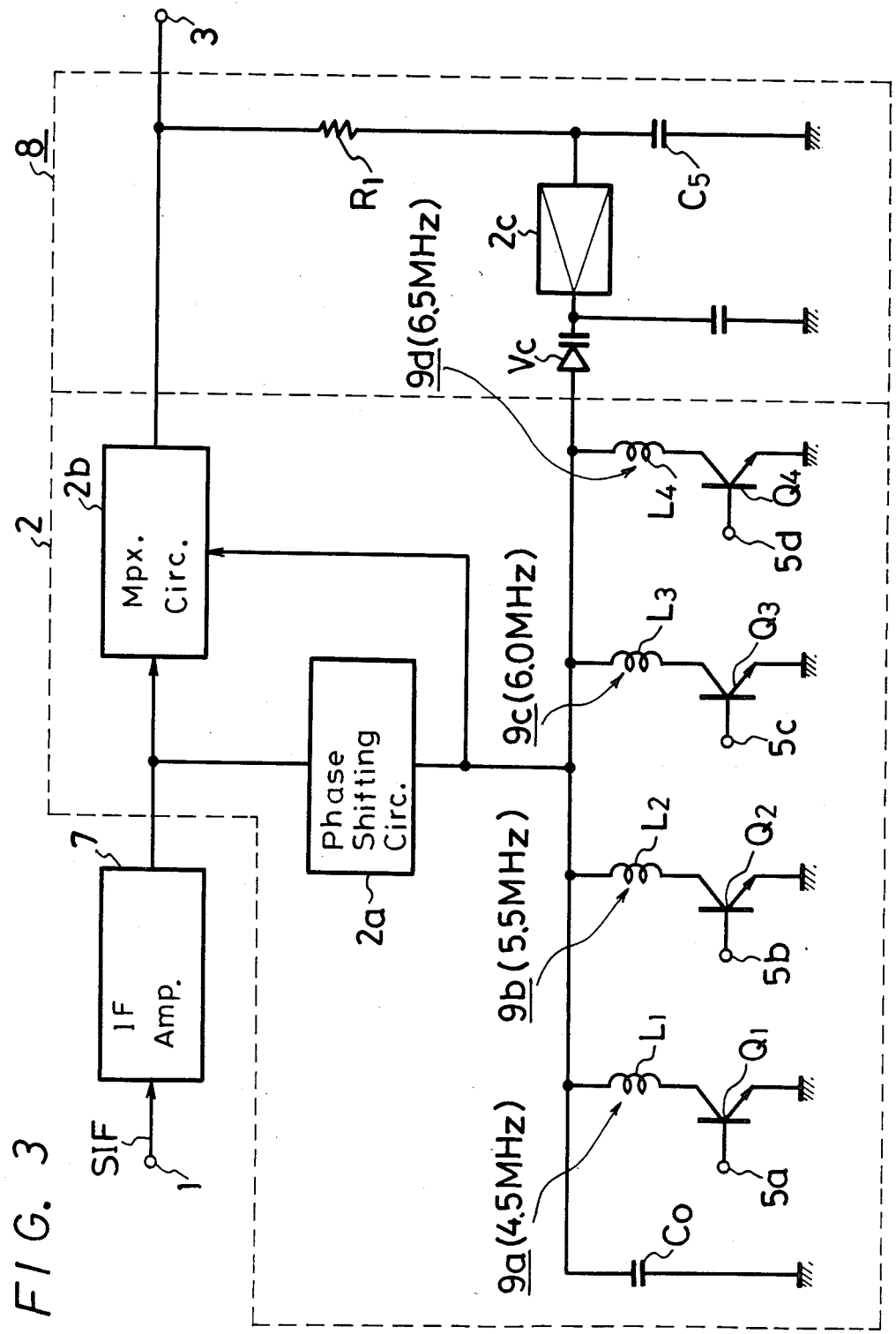
FIG. 3 is a circuit diagram illustrating a sound intermediate frequency signal discriminator according to an embodiment of the present invention.

In FIG. 3, an SIF signal from an input terminal 1 is supplied to a sound intermediate frequency amplifier 7 to be amplified thereby. Then the amplified SIF signal is supplied to one input of a multiplexing circuit 2b and to a $\pi/2$ phase-shifting circuit 2a in an FM detector circuit 2. The SIF signal phase-shifted by the $\pi/2$ phase-shifter circuit 2a is supplied to another input of the multiplexing circuit 2b to be multiplexed with the SIF signal having the original phase. The signal derived from the output of the multiplexing circuit 2b is a detected FM signal. This circuit configuration is known as a quadrature discriminating circuit which is adapted to be formed as an integrated circuit.

The FM detector circuit 2 in FIG. 3 further includes resonance circuits 9a, 9b, 9c and 9d which receive the phase-shifted SIF signal from circuit 2a and which are respectively tuned to the sound intermediate frequencies of different systems, for example, the M system, the B and G systems, the I system, and the D and K systems, respectively. More specifically, in the embodiment of FIG. 3, one end of a capacitor $C_0$ common to all of the resonance circuits is connected with the output of the $\pi/2$ phase shifting circuit 2a, and the other end thereof is grounded. A switching transistor $Q_1$, the emitter of which is grounded, has its collector serially connected with a winding $L_1$. The winding $L_1$ and the capacitor $C_0$ form the parallel resonance circuit 9a, wherein the fixed capacitance value of the capacitor $C_0$ and the fixed inductance value of the winding $L_1$ are selected in such a manner that the parallel resonance circuit 9a is substantially tuned to, for example, the frequency 4.5 MHz which is the sound intermediate frequency of the M system. In the same manner, a winding $L_2$, which forms the resonance circuit 9b with the capacitor $C_0$, has its fixed inductance value selected so that the resonance circuit 9b is tuned to the sound intermediate frequency 5.5 MHz of the B and G systems. Further, the resonance circuits 9c and 9d are formed of the capacitor $C_0$ and windings $L_3$ and $L_4$, respectively, having fixed inductance values selected so as to be tuned to the sound intermediate frequency 6.0 MHz of the I system and the sound intermediate frequency 6.5 MHz of the D and K systems, respectively.

Switching transistors $Q_2$, $Q_3$ and $Q_4$, the emitters of which are grounded, and the collectors of which are connected to the respective windings $L_2$, $L_3$ and $L_4$, serve as switching means serially connected with the windings $L_2$, $L_3$ and $L_4$. One of the resonance circuits 9a, 9b, 9c and 9d is selected by turning ON the respective one of the switching transistors $Q_1$, $Q_2$, $Q_3$, and $Q_4$ to thereby render operative the desired resonance circuit. The windings $L_1$, $L_2$, $L_3$, and $L_4$ are commonly connected with each other and with the capacitor $C_0$ at one ends thereof which are also connected with one end of a variable reactance element Vc, such as, a variable capacitor or the like. The other end of variable reactance element Vc is connected with the output side of the FM detecting circuit 2 through an amplifier circuit 2c and a resistor $R_1$. Further, a capacitor $C_5$ is connected between the output of amplifier circuit 2c and the ground. The resistor $R_1$ and the capacitor $C_5$ form a low pass filter, and an AFC (automatic frequency control) circuit 8 is constituted by the variable reactance element Vc (together with) the resister $R_1$ and capacitor $C_5$.

The operation of the discriminator described above with reference to FIG. 3 is as follows:

If it is assumed that the SIF signal amplified by the sound intermediate frequency amplifier circuit 7 is, for example, of the B or G system, a switching signal is supplied through terminal 5b to the base of the switching transistor $Q_2$ to turn ON the latter, whereby to make operative the resonance circuit 9b formed of the capacitor $C_0$ and the winding $L_2$ and which is substantially tuned to the sound intermediate frequency 5.5 MHz of the B and G systems. If the resonance frequency of the resonance circuit 9b deviates from the correct intermediate frequency 5.5 MHz for the B or G system, for example, by reason of tolerances or scatterings in the characteristics of the elements making up the resonance circuit, changes in such characteristics due to temperature variations, or the distributed capacitance of the wiring or the like. Such deviation in the tuned frecuency causes a variation in the average level of the output signal derived from the output of the sound intermediate frequency detector 2. The variation in the average level of the output signal is detected and fed back through the automatic frequency control circuit 8 to the operative resonance circuit 9b for stabilizing the resonance frequency of the latter. The low pass filter formed by resistor $R_1$ and capacitor $C_5$ permits only direct current components to pass therethrough for feed-back to the resonance circuit 9b, with the capacitance of the variable reactance element or variable capacitor Vc being precisely adjusted thereby to automatically bring the tuned frequency to the central position of 5.5 MHz. The amplifier circuit 2c is a direct current amplifier which is provided to reduce the steady-state difference or error. More particularly, by reason of the insertion of the amplifier circuit 2c, the steady state deviation of the frequency becomes close to the value of the frequency change divided by the gain of the amplifier circuit 2c.

It will be appreciated that the sound intermediate frequency discriminator of FIG. 3 operates similarly to the above for discriminating SIF signals according to the M system, the I system or the D or K system when the transistor $Q_1$, $Q_3$ or $Q_4$ is selectively turned ON for making operative the appropriate resonance circuit 9a, 9c or 9d, respectively.

It will also be apparent that the discriminator according to the embodiment of the inspection described with reference to FIG. 3, requires only a single capacitor $C_0$ having a fixed capacitance value and being connected in common to the windings $L_1$, $L_2$, $L_3$ and $L_4$ which have respective fixed inductance values, so that the discriminator is simplified in construction and its cost of production is low. Another advantage is that adjustments of the elements making up the resonance circuits 9a–9d are not necessary.

It is to be understood that, in a modification of the arrangement shown on FIG. 3, the resonance circuits may be formed of a single common winding and a plurality of respective capacitors each having a different capacitance value so that the resonance frequencies determined by the inductance of the common winding and the capacitances of the respective capacitors are adapted for discriminating the sound intermediate frequencies of the respective television systems.

In the above-described embodiment, the FM detecting circuit 2 is of the quadrature type in its inclusion of the $\pi/2$ phase-shifting circuit 2a and the multiplexing circuit 2b. However, a well-known differential peak detector circuit or the like may be used for FM detecting circuit 2, in which case (not shown) the sound intermediate frequency (signal SIF) is supplied to a limiter which limits the amplitude thereof, and an amplitude characteristic signal resonant with two frequencies $f_1$ and $f_2$ is amplified and supplied to a peak or amplitude detector to be differentially amplified thereby.

Figure 4:
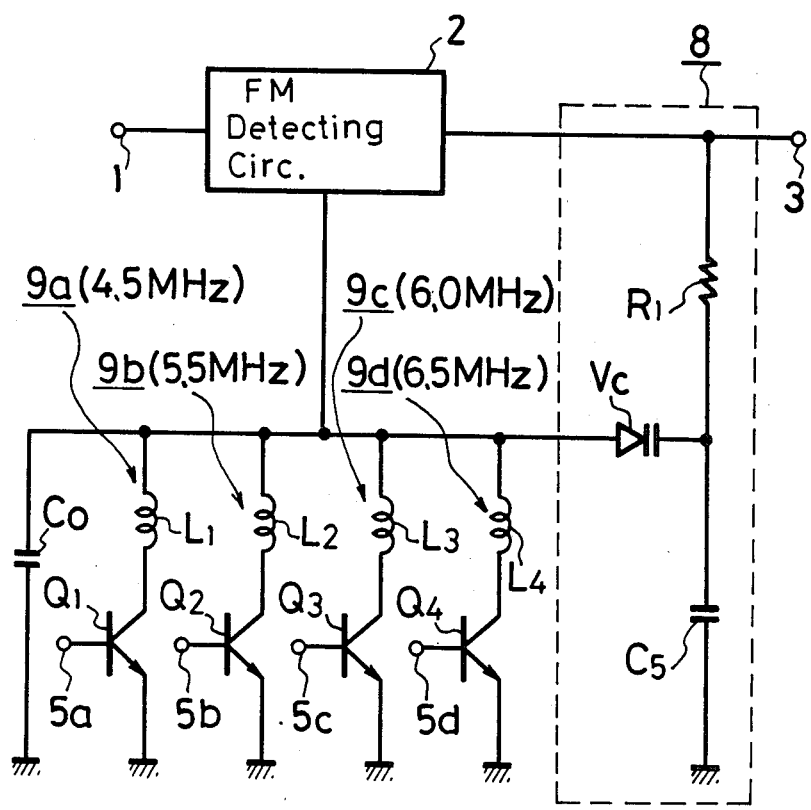
FIGS. 4, 5 and 6 are circuit diagrams showing sound intermediate frequency signal discriminators according to other respective embodiments of the present invention.

FIG. 4 shows a sound intermediate frequency discriminator according to a second embodiment of the present invention which is similar to the circuit of FIG. 3, but with the removal therefrom of the amplifier circuit 2c connected between the variable reactance element Vc and the connection point between the capacitor $C_5$ and the resistor $R_1$ in the AFC circuit 8. The FM detecting circuit 2 in FIG. 4 is assumed to include the $\pi/2$ phase-shifting circuit 2a and the multiplexing circuit 2b of FIG. 3, which are not shown for the sake of simplicity. It will be understood that the frequency discriminator of FIG. 4 operates similarly to the circuit of FIG. 3 as described above and is further simplified by its omission of the amplifier 2c.

Figure 5:
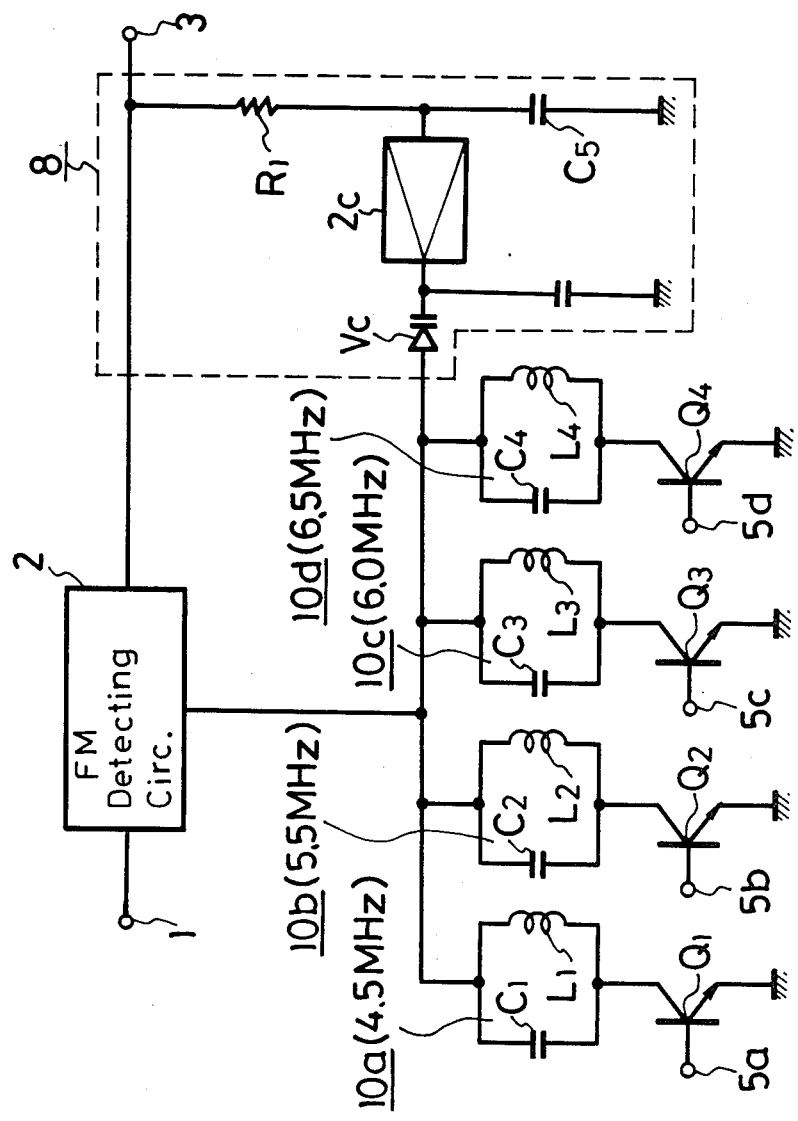
Figure 6:
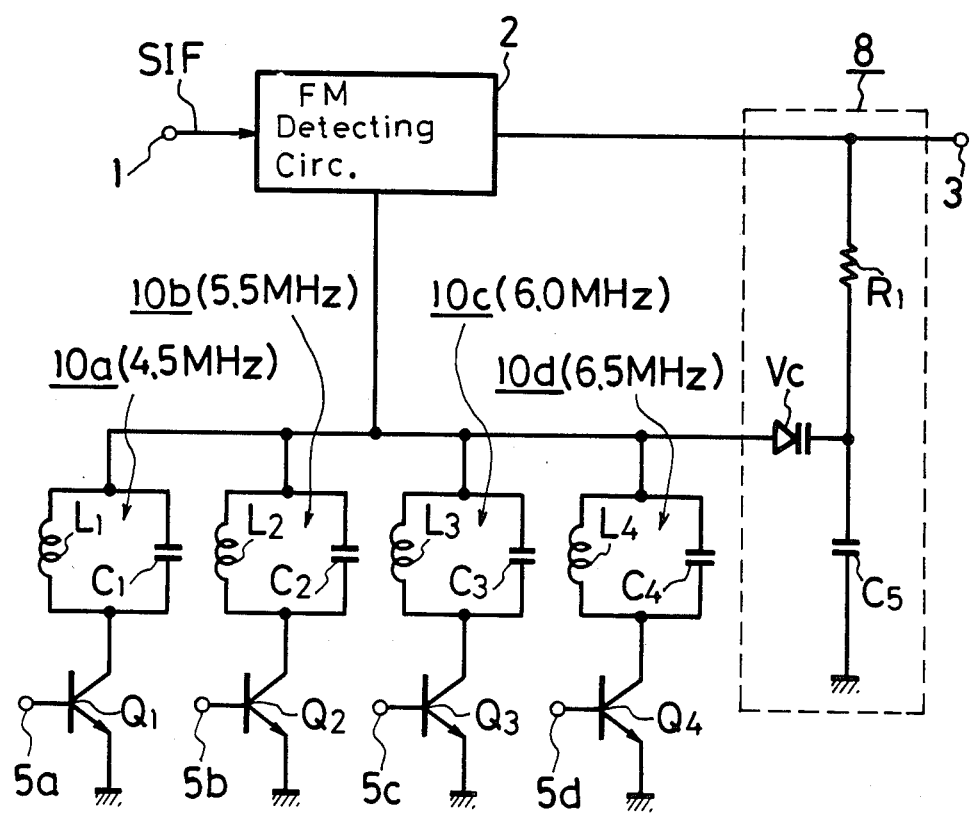

FIGS. 5 and 6 show additional embodiments of the invention that are otherwise similar to the embodiments of FIGS. 3 and 4, respectively, but in which the single capacitor $C_0$ common to all of the resonance circuits 9a, 9b, 9c and 9d is replaced by fixed capacitors $C_1$, $C_2$, $C_3$ and $C_4$ connected in parallel with the fixed windings $L_1$, $L_2$, $L_3$ and $L_4$, respectively to constitute resonance circuits 10a, 10b, 10c and 10d adapted to resonate at the fixed frequencies of 4.5 MHz, 5.5 MHz, 6.0 MHz and 6.5 MHz, respectively, characteristic of the M, B and G, I, and D and K television systems. FIG. 5 differs from FIG. 6 only in that the amplifier LC is omitted from the AFC circuit 8 in the latter.

Although individual capacitors $C_1$–$C_4$ are employed in the resonance circuits 10a–10d of the embodiments of the invention shown on FIGS. 5 and 6, such capacitors $C_1$–$C_4$ and the windings $L_1$–$L_4$ connected therewith all have fixed values of capacitance and inductance, respectively, so that adjustment-free and relatively simplified resonance circuits are employed in the sound intermediate frequency disciminators according to such embodiments. In other words, in the embodiments of FIGS. 5 and 6, as well as those shown in FIGS. 3 and 4, a single variable reactance element Vc is employed for ensuring proper tuning of all of the resonance circuits. Of course, in the case of the embodiments shown in FIGS. 3 and 4, the circuit of the sound intermediate frequency discriminator is further simplified by the fact that, in addition to the variable reactance element Vc, the capacitor $C_0$ (or a winding) is common to all of the resonance circuits which resonate at frequencies characteristic of the various television systems.

Although preferred embodiments of the invention have been described in detail herein with reference to the accompanying drawings, it is to be understood that the invention is not limited to those precise embodiments, and that many modifications and variations could be effected therein by one skilled in the art without departing from the spirit or scope of the invention as defined by the appended claims.

What is claimed:

1. A sound intermediate frequency discriminator comprising:

frequency detecting means including a plurality of resonance means for detecting a plurality of respective sound intermediate frequencies which are different from each other, each of said resonance means being formed of winding means having a respective fixed inductance value and capacitive means;

a plurality of switching means selectively operable for selecting one of said plurality of reasonance means and thereby adapting said frequency detecting means for detection of the respective sound intermediate frequency;

a variable reactance element connected in common with said plurality of resonance means and controllable for correcting any deviation of a tuned frequency of said selected one of the resonance means from the respective sound intermediate frequency; and direct current feedback loop means for feeding an average output voltage from said frequency detecting means to said variable reactance element for controlling the latter.

2. A sound intermediate frequency discriminator according to claim 1; in which said direct current feedback loop means includes a direct current amplifier.

3. A sound intermediate frequency discriminator according to claim 1; in which said variable reactance element is a variable capacitor.

4. A sound intermediate frequency discriminator according to claim 1; in which said capacitive means is constituted by a single capacitor which is commonly connected with said winding means of all of said plurality of resonance means.

5. A sound intermediate frequency discriminator according to claim 4; in which said frequency detecting means is of the quadrature detector type.

6. A sound intermediate frequency discriminator according to claim 1; in which said frequency detecting means is of the quadrature detector type.

7. A sound intermediate frequency discriminator according to claim 1; in which each of said switching means includes a transistor having a grounded emitter.

8. A sound intermediate frequency discriminator according to claim 1; in which said capacitive means includes a capacitor for each of said resonance means connected in parallel with the respective winding means and being independent of the capacitor of each of the others of said plurality of resonance means.

* * * * *